(12) United States Patent
Bastiyali

(10) Patent No.: US 11,709,371 B2
(45) Date of Patent: *Jul. 25, 2023

(54) VEHICLE MOUNTABLE HOLOGRAPHIC PROMOTING SYSTEM

(71) Applicant: BASTIYALI INVENTIONS LLC, New York, NY (US)

(72) Inventor: Tarkan Bastiyali, New York, NY (US)

(73) Assignee: Bastiyali Inventions LLC, New York, NY (US)

( * ) Notice: Subject to any disclaimer, the term of this patent is extended or adjusted under 35 U.S.C. 154(b) by 470 days.

This patent is subject to a terminal disclaimer.

(21) Appl. No.: 16/731,891

(22) Filed: Dec. 31, 2019

(65) Prior Publication Data

US 2020/0387931 A1 Dec. 10, 2020

Related U.S. Application Data

(63) Continuation-in-part of application No. 16/435,267, filed on Jun. 7, 2019, now Pat. No. 10,755,612.

(51) Int. Cl.
*G02B 27/02* (2006.01)
*G06Q 30/02* (2012.01)
(Continued)

(52) U.S. Cl.
CPC .......... *G02B 27/02* (2013.01); *G03H 1/0005* (2013.01); *G06Q 30/0265* (2013.01); *G03H 2001/0055* (2013.01)

(58) Field of Classification Search
CPC .... H04N 13/31; H04N 13/305; H04N 13/317; H04N 13/324; H04N 13/302; H04N 13/32; H04N 13/366; H04N 13/315; H04N 13/322; H04N 13/368; H04N 13/371; H04N 13/239; H04N 13/312; H04N 13/337; H04N 13/346; H04N 13/356; H04N 13/373; H04N 13/376; H04N 13/398; H04N 13/00; H04N 13/207; H04N 13/211; H04N 13/282; H04N 13/296; H04N 13/307; H04N 13/354; H04N 13/363; H04N 13/378; H04N 13/10; H04N 13/218; H04N 13/30; H04N 13/339; H04N 13/351; H04N 13/38; H04N 13/383; H04N 13/39; H04N 9/3129; H04N 9/3185; H04N 2213/001; H04N 2213/002; H04N 2013/403; H04N 2013/405;

(Continued)

(56) References Cited

U.S. PATENT DOCUMENTS 5,724,161 A 3/1998 Smith
2017/0308930 A1 10/2017 Shore

FOREIGN PATENT DOCUMENTS

CN 208268090 U 12/2018

*Primary Examiner* — Darryl J Collins
*Assistant Examiner* — Tamara Y. Washington
(74) *Attorney, Agent, or Firm* — Lerner David LLP

(57) ABSTRACT

A vehicle mountable holographic promoting system and method of use; the vehicle mountable holographic promoting system includes a body with at least one light, a mount, and a controller in communication with a software application and the body. The body is mountable to the vehicle via the mount. The mount is able to be removably attachable or otherwise secured to roof of a vehicle. The controller controls the body such that the body is able to visually promote via an image display at least one promotable item using the at least one light. The promotable item appearing to float on a plane above the vehicle.

19 Claims, 6 Drawing Sheets

(51) Int. Cl.
*G03H 1/00* (2006.01)
*G06Q 30/0251* (2023.01)

(58) Field of Classification Search
CPC ....... H04N 2013/0081; H04N 5/23296; H04N 5/23212; H04N 5/2254; H04N 5/232; H04N 5/2351; H04N 5/238; H04N 1/0423; H04N 1/405; H04N 21/2365; H04N 21/25875; H04N 21/4347; H04N 21/441; H04N 21/6125; H04N 21/8146; H04N 21/816; G02B 27/2214; G02B 27/22; G02B 27/225; G03H 1/10; A63F 2250/302; G09F 21/04; G09F 21/042; G09F 19/18; G09F 19/125; G09F 13/00; G09F 19/12

See application file for complete search history.

VEHICLE MOUNTABLE HOLOGRAPHIC PROMOTING SYSTEM

CROSS-REFERENCE TO RELATED APPLICATIONS

This application is a Continuation-In-Part of U.S. application Ser. No. 16/435,267, filed on Jun. 7, 2019, pending, and fully incorporates the content of that application by this reference.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

FIELD OF THE INVENTION

The present invention relates generally to the field of displays and more specifically relates to vehicular advertising displays.

DESCRIPTION OF RELATED ART

Advertising media such as newspapers, public radio, television, and billboards has suffered a dramatic decrease in popularity and advertising effectiveness with the advent of the internet and mobile phone technology. Sponsors, therefore, are highly motivated to identify new methods of distributing advertisements in order to create effective brand awareness. As newer technologies such as mobile phones evolve into highly sophisticated two-way communication systems, such technologies can be leveraged to provide trackable advertising impressions and brand awareness by directly displaying advertisements and testimonials to potential customers.

Providing advertisement on motor vehicles is well known in the art and various advertising methods have become known for this purpose. For instance, a motor vehicle may be provided with advertisement or logo on the vehicle's body such as the door or fender. These advertisements or logos may be painted on the vehicle's body or otherwise affixed, for example, by magnets or using decals with adhesives. These types of advertising methods have been extensively used in the art. Due to the fixed amount of surface area available on a motor vehicle's body, the advertising is often very small while the cost for placing such advertisement is very high, especially for vehicles which win races frequently. In exchange, however, the sponsors who purchase such space on the motorsport vehicles are provided with a very large spectator audience and media coverage that may continually view their advertisements as the motorsport vehicle is raced on the racetrack. Thus, although expensive, such advertising on the motorsport vehicle body by the sponsors provide direct and indirect benefits to the sponsors in increased sales of their products/services and improve goodwill toward the advertiser.

Of course, the owner and/or operator of the motorsport vehicle would like to charge the highest amount possible for such advertising space on the motor vehicle body to maximize the revenue generated by such advertisements. Whereas the revenue which can be generated may technically only be limited by the surface area available on the vehicle's body, a more pragmatic limit exists. More specifically, if too much advertising is provided on a vehicle, the large amount of advertising on the motor vehicle's body cause observers to ignore the advertisements thereby reducing advertisement's efficacy. A suitable solution is desired.

U.S. Pub. No. 2017/0308930 to Michael W. Shore relates to a vehicle advertising system and method. The described vehicle advertising system and method comprises an electronic display located on a vehicle with the electronic display operably connected to a microcontroller. A vehicle brake pedal is operably connected to the microcontroller and the electronic display, wherein when an operator of the vehicle applies the brake pedal, one or more messages are displayed on the electronic display and when the operator releases the brake pedal, the message (or messages) is no longer displayed via the electronic display. In some example embodiments, the electronic display may be implemented in the context of particular display devices, such as, for example, an electronic holographic display that utilizes light diffraction to create a virtual three-dimensional image of an object. Such a holographic display or another form of 3D imaging can be utilized to electronically display images in electronic display without requiring the aid of any special glasses or external equipment for a viewer (e.g., other drivers and/or passengers in other vehicles) to see the messages including images displayed via the electronic display.

BRIEF SUMMARY OF THE INVENTION

In view of the foregoing disadvantages inherent in the known displays art, the present disclosure provides a novel vehicle mountable holographic promoting system. The general purpose of the present disclosure, which will be described subsequently in greater detail, is to provide an efficient and effective promotion means.

A vehicle mountable holographic promoting system is disclosed herein. The vehicle mountable holographic promoting system includes a body with at least one light, a 3D fan projector, a mount, and a controller. The body is mountable to the vehicle via a mount such as a removable clip. The mount is able to be removably attachable or otherwise secured to the vehicle without damaging a vehicle. The controller controls the body such that the body is able to visually promote via an image display at least one promotable item using at least one light. The promotable item appears to float on a plane above the vehicle as a holographic image. The vehicle mountable holographic promoting system further comprises a solar panel, batteries or other suitable powering means to power the vehicle mountable promoting system. Operation of a throttle or gas pedal of a vehicle activates the 3D fan projector to begin to rotate and display the promotable item. The controller includes a cellular phone comprising a software application able to specifically control scheduling and advertisement content from a pre-filled business list and specifically control on and off conditions. The vehicle mountable holographic promoting system may further include a display-screen located on a dashboard of the vehicle and communicably coupled with the controller.

A method of using the vehicle mountable holographic promoting system is also disclosed herein. The method of using vehicle mountable holographic promoting system may comprise the steps of providing the vehicle mountable promoting system including a body with at least one light, a mount, and a controller; the body is mountable to a vehicle via the mount, the mount able to be removably attachable, the controller controlling the body such that the body is able to visually promote via an image display at least one promotable item using the at least one light, the promotable item appearing to float on a plane above the vehicle; mounting the vehicle mountable promoting system to a top of the vehicle via the mount; moving the vehicle to cause rotation of the 3d fan projector; and utilizing the controller to display the at least one promotable item on the body via the at least one light and the 3d fan projector.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with viewing the following drawings and detailed description.

BRIEF DESCRIPTION OF THE DRAWINGS

The figures which accompany the written portion of this specification illustrate embodiments and methods of use for the present disclosure, a vehicle mountable holographic promoting system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to displays and more particularly to a vehicle mountable holographic promoting system as used to improve the display of advertisements using a movable 3D hologram mountable to a roof of a car, train, bus, helicopter, drone, blimp, air taxi, or other moving object.

Generally, the present invention provides such an advertising method that will increase advertising opportunities for advertisers as well as maximizing the advertising revenues for the motor vehicle owner and/or operator. The vehicle mountable holographic promoting system is mountable to a roof or other surface of a vehicle to display a holographic image for promotion of products, events, promotional item or other advertisement image. A body of the vehicle mountable holographic promoting system may be mounted to the vehicle using various suitable clips or fasteners for temporarily securing the device to the vehicle without damaging the vehicle. In certain embodiments, pyramid hologram display technology may be used to display the promotional item.

As an example, a taxicab office may collect payments for ads and receive a video by email from a company who wishes to advertise. Files are received in a format compatible with the 3D projector and a software application of the invention. The file then can be emailed to a cab driver assigned to a job, and the cab driver will be responsible to download the material and save it in the software application, and manually insert each company ad in not only the assigned time slot, but also on the day, and even month when the ad is scheduled to run. Once all ads are saved in an assigned time slot, the cab driver will sync the ads with the 3D projector or other similar technology using Wi-Fi or a chip inserted in the 3D projector. While on the road the cab driver will simply activate the 3D projector and ads will automatically display based on the scheduled time for each ad. Alternatively, the driver can download the ads using appropriate controls. In some embodiments, the driver or ad operator can see the ads listed in the order they are scheduled to run. And this can be controlled using appropriate controls, as well. In some cases, appropriate controls can be a touch screen, mobile phone, or other control mechanisms.

Display resolution may be 720P 1080P, High Definition, 4k, or other suitable resolution. Ads may feature logos, text, hologram movies or images which may be rotating and 3d dimensional. Speed selection for the ad may be available to select rotational speeds ranging from slow, medium to fast.

Figure 1:
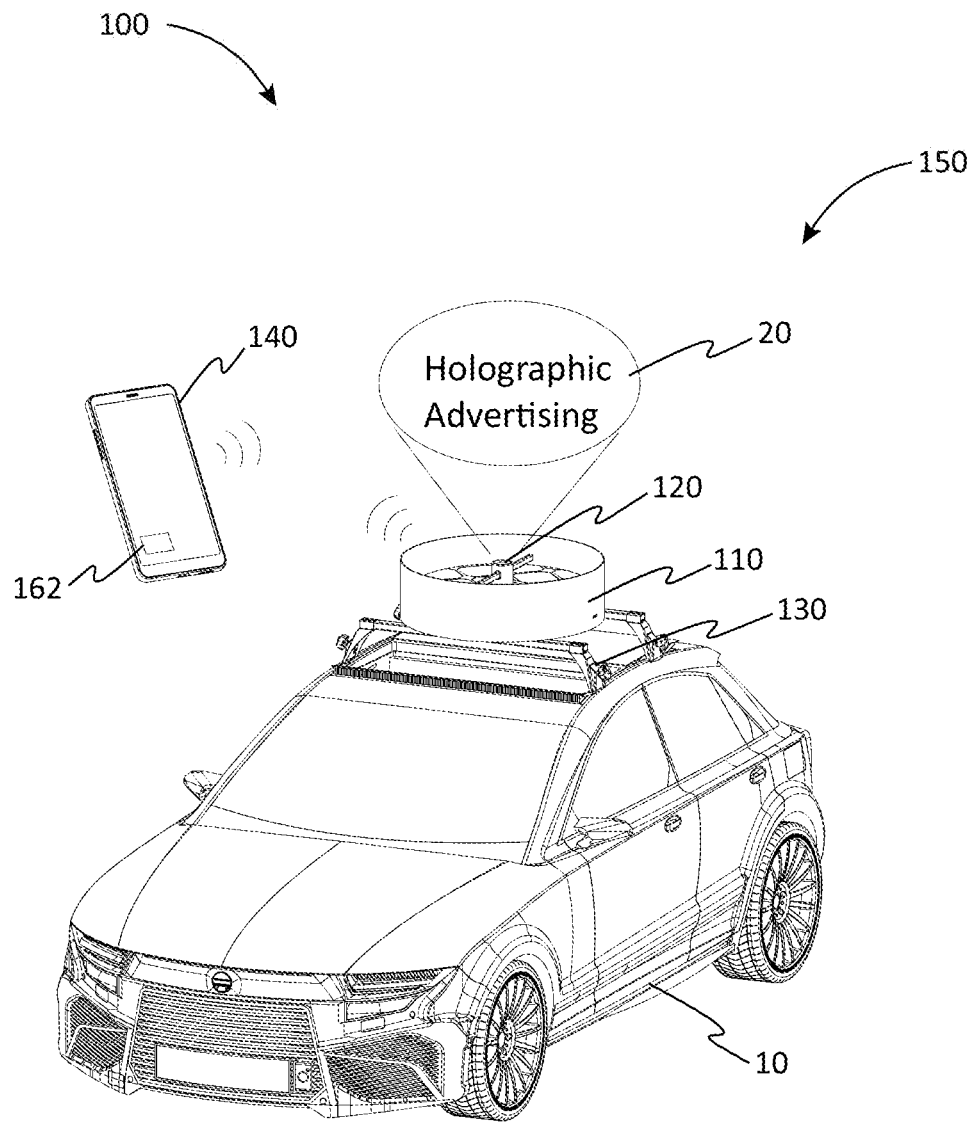
FIG. 1 is a perspective view of the vehicle mountable holographic promoting system during an 'in-use' condition, according to an embodiment of the disclosure.
Figure 2:
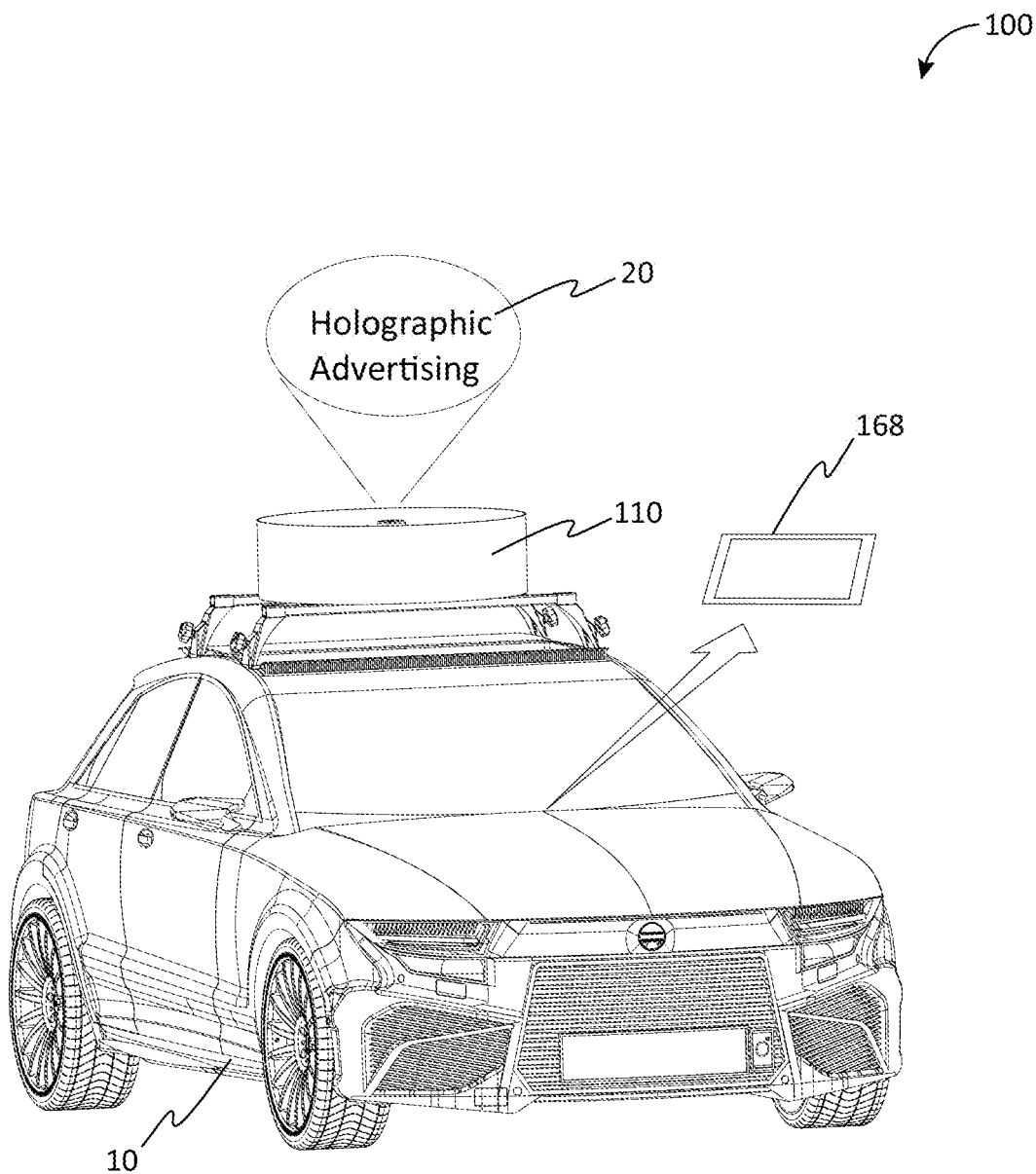
FIG. 2 is a perspective view of the vehicle mountable holographic promoting system of FIG. 1, according to an embodiment of the present disclosure.

Referring now more specifically to the drawings by numerals of reference, there is shown in FIGS. 1-4, various views of a vehicle mountable holographic promoting system 100. FIG. 1 shows a vehicle mountable holographic promoting system 100 during an 'in-use' condition 150, according to an embodiment of the present disclosure. As illustrated, the vehicle mountable holographic promoting system 100 may include a body 110 with at least one light 120, a mount 130, and a controller 140. The body 110 is mountable to a vehicle 10 via the mount 130 which may include a removable clip or other suitable mounting fasteners. The mount 130 is able to be removably attachable or otherwise secured to the vehicle 10. The controller 140 controls the body 110 such that the body 110 is able to visually promote via an image display at least one promotable item 20 using the at least one light 120. The promotable item 20 appearing to float on a plane above the vehicle 10 as a holographic image.

As above, the vehicle mountable holographic promoting system 100 may include the body 110 with at least one light 120, the mount 130, the controller 140, and a 3D fan projector 144. The body 110 comprises a glass dome which is provided to protect the 3D projector 144 from weather damage, water, or other ambient environmental elements. In certain embodiments, the vehicle mountable holographic promoting system 100 further comprises a solar panel 160 configured to collect solar power during lighted conditions and power the vehicle mountable promoting system 100. Various additional sources of power may be used including batteries or a power cord and adaptor for a vehicle cigarette lighter socket or the like (or device may be wired OEM to existing vehicle wiring system). The solar panel 160 may be square or round shaped with the 3D fan projector 144 being positioned in a center portion flush with a top of the glass dome. The glass dome may be approximately 12 inches high and 36 inches wide to exceed a width of the solar panel 160 and 3D projector 144.

Movement of the vehicle caused by operation of the vehicle 10 throttle or gas pedal causes the 3D fan projector 144 to begin to rotate and display the promotable item 20. The 3D fan projector 144 may be configured to detect motion of a vehicle 10 such that when a driver steps on a gas pedal, the 3D fan projector 144 will start to rotate clockwise (or alternately counter-clockwise) and display the image display at least one promotable item 20 using the at least one light 120. Other means for detecting vehicle movement may be used for various types of vehicles 10 including but not limited to a train, a bus, a helicopter, a car, a ferry, a boat, blimp, air taxi, or a drone. Various embodiments employ various vehicles including self-powered and human-powered vehicles, such as bicycles, scooters, sailboats etc. as long as the vehicle is large enough to support the projection device or as long as the vehicle can pull a trailer that can support the projection device. The non-movement of the vehicle 10 causes the 3D fan projector 144 to not display the promotable item 20 or otherwise stop projecting the promotable item 20.

Figure 3:
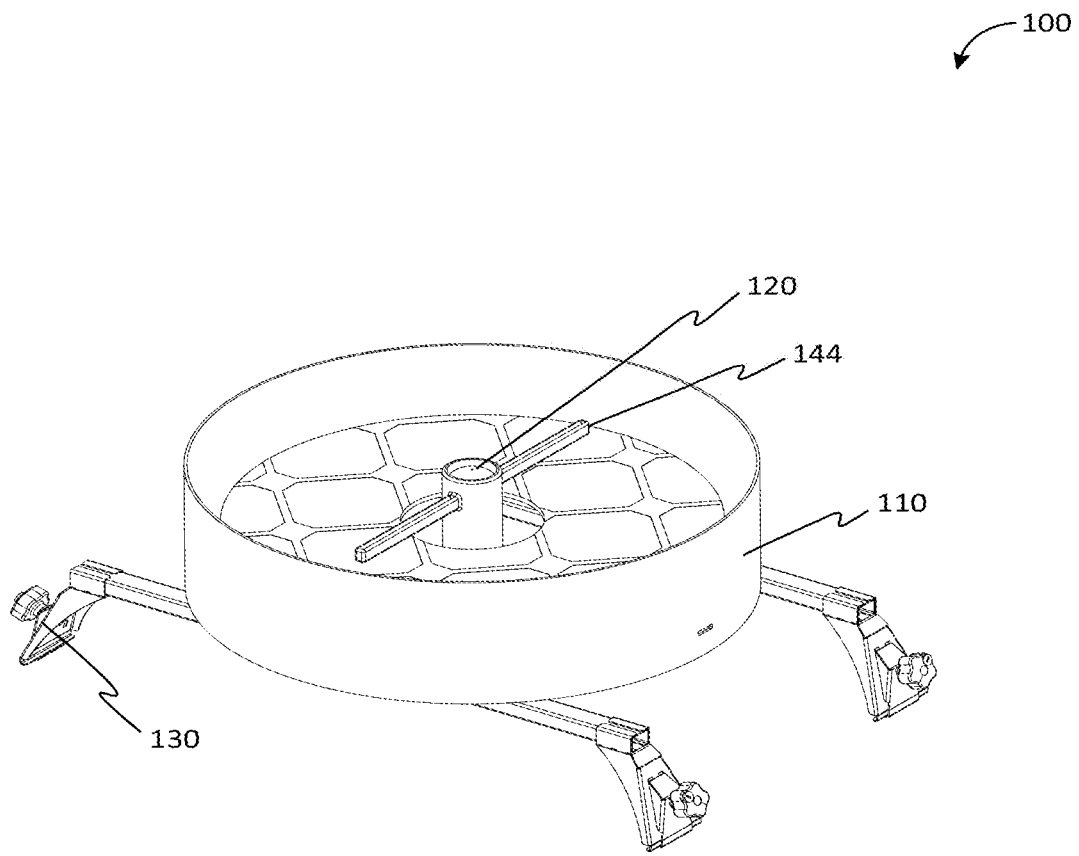
FIG. 3 is a perspective view of the vehicle mountable holographic promoting system of FIG. 1, according to an embodiment of the present disclosure.

FIG. 3 shows a perspective view of the vehicle mountable holographic promoting system 100 of FIG. 1, according to an embodiment of the present disclosure. As above, the vehicle mountable holographic promoting system 100 may include the body 110 with at least one light 120, the mount 130, the controller 140, and a 3D fan projector 144. The 3D fan projector 144 is able to be controlled as to rotation speed and direction via the controller 140. In the preferred embodiment, the controller 140 is a cellular phone or other touchscreen electronic device connectable to WIFI and comprises a software application 162 able to specifically control scheduling and advertisement content from a pre-filled business list and to specifically control on and off conditions. The control scheduling comprises fillable time-slots which may be scheduled with advertisement content. The promotable item 20 is displayable and viewable during lighted and non-lighted conditions.

In some versions, riders in the vehicle can interact with the ad. For instance, the rider could add special effects or change the rotation to customize the ad's look. For instance, an application could add fireworks or water splashing above the ad. One special effect could cause projection of an image 100 feet in the air. Some versions could allow the riders to save the ad along with the special effects into their own social media account (INSTAGRAM or TICTOK) and share their creation with their friends. The advertisers could customize their ad to allow for specific types of special effects and perhaps could run contests to see who created the best add. The advertisers could give riders a future or current discount for their customization of the ads.

Figure 6:
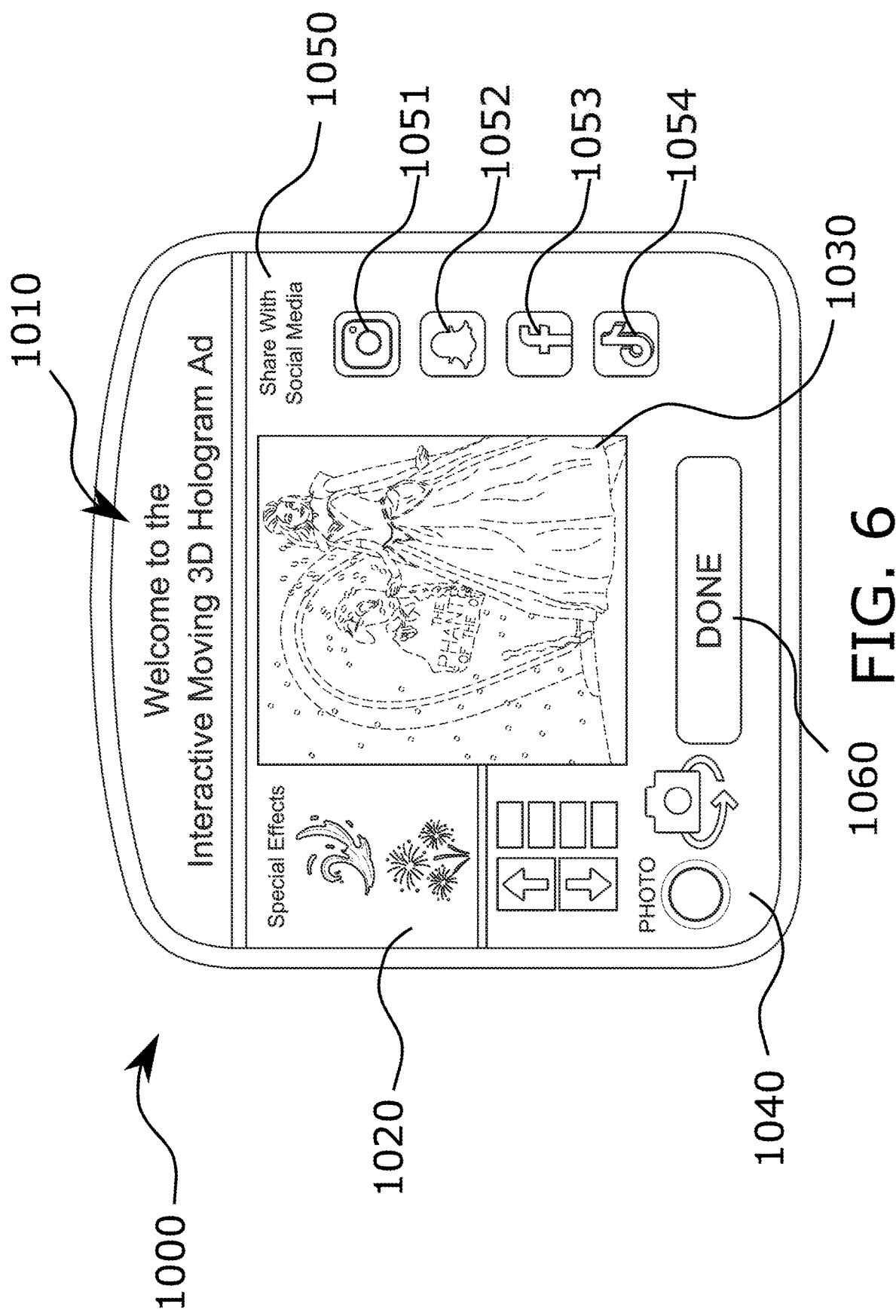
FIG. 6 is a depiction of a user interface for the holographic promoting system according to an embodiment of this invention.

The rider or passenger has extensive control over the 3D ad using an interface, user interface, shown in FIG. 6. Some versions of the customization software allow a user to upload their unique rendition of the hologram ad to social media so that they can share their creation with their friends or followers. Many different social media formats can facilitate the user sharing their creation. These formats or platforms include INSTAGRAM, SnapChat, Facebook, TIK-TOK, or similar social media platforms that exist now or are created later.

In addition to the following controls, the passenger can adjust the height of the ad above the vehicle. FIG. 6 shows a depiction of an interface 1000 used to customize holographic 3D ads. It includes title 1010, a special effects palette 1020, a preview region 1030 to allow previewing the creation, a photo palette 1040, and a share palette 1050. Finally, there is a save or share button 1060. As can be seen in the figure, share palette 1050 shows an INSTAGRAM button 1051, a SnapChat button 1052, a Facebook button, 1053, and a TIK-TOK button 1054. Of course, any other platforms could also contain corresponding buttons in share palette 1050. In some versions preview region 1030 also connects to a camera outside of the car so that the passenger can see a real view of their creation.

The user interface unit 1000 can also be used to entertain the passenger. For instance, the screen could be used to watch videos or play video games. The unit could also be used to charge for the ride, for playing the video or video games, or for any other provided service. The unit can use typical payment methods including payment methods employing facial recognition or other biometric information.

In some circumstances, the 3D hologram ad can distract the driver. This distraction can be alleviated or rectified in a variety of ways. In some versions, the driver wears special glasses that filter out or block the hologram. Alternatively, an optical coating or electronic device is placed on the windshield which filters the hologram or dims it.

These methodologies can be implemented for the drivers of other vehicles, as well. That is, whether the hologram projector is on the driver's vehicle or another vehicle, various embodiments exist that allow drivers to filter out any potential distraction from the hologram.

The user can modify the ad by adding special effects like splashing water or fireworks. Or the user can take a selfie with the ad or insert some other photo into the ad. As desired, the owner of the ad or product can limit the types of customizations available for the user in order to prevent the user from inadvertently changing the message to something not desired by the owner or to prevent other shenanigans.

The vehicle mountable holographic promoting system 100 further includes a display-screen 168 located on a dashboard of the vehicle 10 and communicably coupled with the controller 140. The display-screen 168 displays information of the fillable time-slots of each ad and will sync with the software application 162 and 3D fan projector 144 simultaneously. A transmitter inserted in a vehicle cigarette lighter socket using BLUETOOTH (or other near range) technology will sync the ads inserted in different fillable time-slots on the software application 162 with the 3D fan projector 144 on top of the vehicle 10 simultaneously. This way a driver may view the ads displayed on the display-screen 168. In an event that WIFI technology of the invention is not connecting or otherwise functioning, a waterproof slot is provided on the 3D fan projector 144 for receiving a memory card or the like containing data of the ads.

Figure 4:
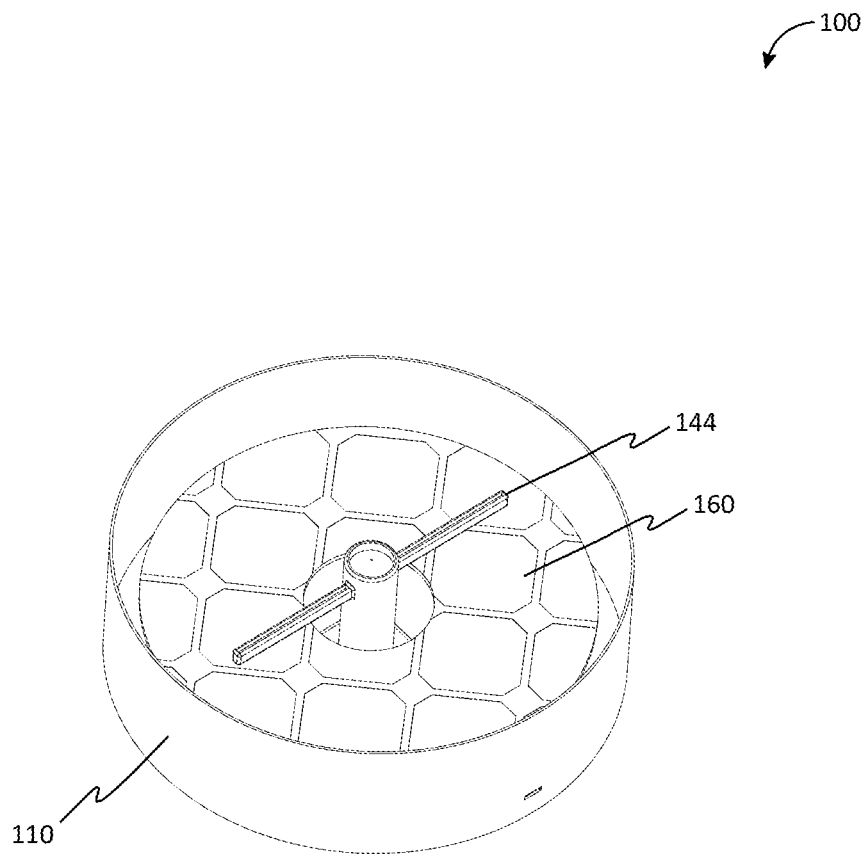
FIG. 4 is a perspective view of the vehicle mountable holographic promoting system of FIG. 1, according to an embodiment of the present disclosure.

FIG. 4 shows a perspective view of the vehicle mountable holographic promoting system 100 of FIG. 1, according to an embodiment of the present disclosure. As above, the vehicle mountable holographic promoting system 100 may include the body 110 with at least one light 120, the mount 130, the controller 140 preferably having a touchscreen, and a 3D fan projector 144 configured to display a holographic advertising image including at least one promotable item 20. The mount 130 is mounted to the vehicle 10 via a non-destructive means such that a skin of the vehicle 10 is not compromised (via drilled holes or other). The vehicle mountable holographic promoting system 100 may further comprises a remote camera.

Figure 5:
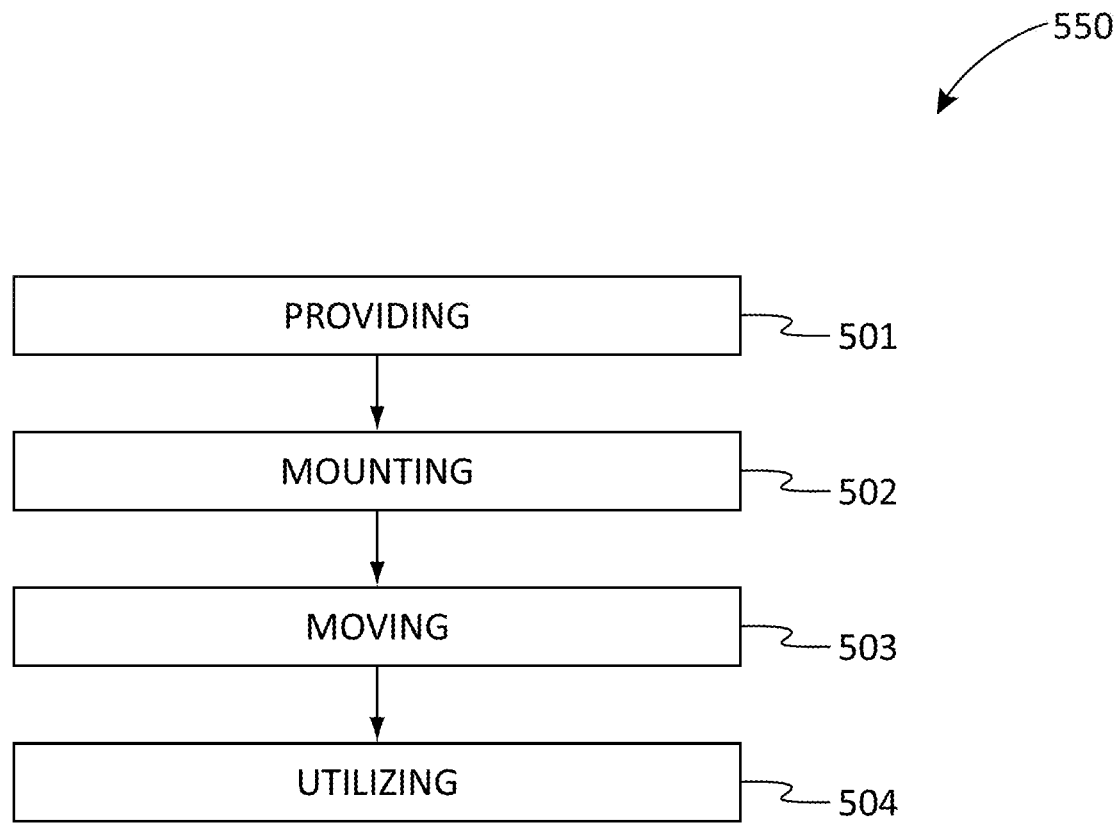
FIG. 5 is a flow diagram illustrating a method of use for the vehicle mountable holographic promoting system, according to an embodiment of the present disclosure.

FIG. 5 is a flow diagram 550 illustrating a method of using a vehicle mountable promoting system, according to an embodiment of the present disclosure. As illustrated, the method of using a vehicle mountable promoting system may include step one 501, providing the vehicle mountable promoting system 100 including a body 110 with at least one light 120, a mount 130, and a controller 140; the body 110 is mountable to a vehicle 10 via the mount 130, the mount 130 able to be removably attachable, the controller 140 controlling the body 110 such that the body 110 is able to visually promote via an image display at least one promotable item 20 using the at least one light 120, the promotable item 20 appearing to float on a plane above the vehicle 10; step two 502, mounting the vehicle mountable promoting system 100 to a top of the vehicle 10 via the mount 130; step three 503, moving the vehicle 10 to cause rotation of the 3d fan projector 144; and step four 504, utilizing the controller 140 to display the at least one promotable item 20 on the body 110 via the at least one light 120 and the 3d fan projector 144.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using the vehicle mountable holographic promoting system 100 (e.g., different step orders within abovementioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A vehicle mountable holographic promoting system comprising:
   a body with at least one light
   and
   a controller,
   wherein the body is mountable to the vehicle using a removably attachable mount, the controller controlling the body such that the body is configured to visually promote via an image display at least one promotable item using the at least one light, the promotable item appearing to float above the vehicle.

2. The system of claim 1, wherein the mount comprises a removable clip.

3. The system of claim 1, wherein the body further comprises a 3D fan projector.

4. The system of claim 3, wherein the body comprises a glass protection dome.

5. The system of claim 1, wherein the controller comprises a processor and computer memory containing software instructions.

6. The system of claim 5, wherein the software instruction facilitate a user or rider playing a video game on the controller.

7. The system of claim 6, wherein the software instructions facilitate changing an appearance of the promotable item.

8. The system of claim 7 wherein instructions to change the appearance of the promotable item include instructions to make a height of a projection of the promotable item from 1 to 100 ft.

9. The system of claim 6, wherein the software instructions facilitate a user or rider sharing the promotable item to a social media platform.

10. The system of claim 6, wherein the software instructions facilitate accepting payment from a user or rider.

11. The system of claim 6, wherein the software instructions facilitate an advertiser operating a contest.

12. The system of claim 1, wherein the promotable item is displayable and viewable during lighted and non-lighted conditions.

13. A method of using a vehicle mountable promoting system comprising:
   providing the vehicle mountable promoting system including:
      a body with at least one projector;
      a mount;
      and
      a controller,
      wherein the body is able to visually promote a 3D image of an item, the item appearing to float above the vehicle;
   mounting the system to the vehicle;
   activating the projector by moving the vehicle;
   and
   using the controller and projector to display the 3D image.

14. The method of claim 13 further comprising a system that prevents the 3D image from distracting the driver.

15. The method of claim 13, wherein the controller comprises a processor and computer memory containing software instructions and the method further comprises executing the software instructions.

16. The method of claim 15, wherein the software instructions facilitate changing the appearance of the ad.

17. The method of claim 15, wherein the software instructions facilitate a user or rider sharing the ad to a social media platform.

18. The method of claim 15, wherein the software instructions facilitate receiving payment from a user or rider.

19. The method of claim 15, wherein the software instructions facilitate an advertiser operating a contest.

* * * * *